United States Patent
Janning

(10) Patent No.: US 9,781,792 B1
(45) Date of Patent: *Oct. 3, 2017

(54) LOW COST LED LIGHT STRING FOR PRE-LIT CHRISTMAS TREES

(71) Applicant: JLJ, Inc., Bellbrook, OH (US)

(72) Inventor: John L. Janning, Bellbrook, OH (US)

(73) Assignee: JLJ, Inc., Bellbrook, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/478,928

(22) Filed: Apr. 4, 2017

Related U.S. Application Data

(60) Provisional application No. 62/473,323, filed on Mar. 18, 2017.

(51) Int. Cl.
| H05B 33/08 | (2006.01) |
| A47G 33/08 | (2006.01) |
| A47G 33/06 | (2006.01) |

(52) U.S. Cl.
CPC .......... *H05B 33/083* (2013.01); *A47G 33/06* (2013.01); *A47G 33/08* (2013.01); *H05B 33/0809* (2013.01); *H05B 33/089* (2013.01); *A47G 2033/0827* (2013.01)

(58) Field of Classification Search
CPC .... H05B 33/083; H05B 33/089; A47G 33/06; F21S 4/10
See application file for complete search history.

(56) References Cited

U.S. PATENT DOCUMENTS

| | | | | |
|---|---|---|---|---|
| 8,569,960 B2 * | 10/2013 | Chen | ...................... | A47G 33/06 315/185 R |
| 9,433,057 B1 | 8/2016 | Janning | | |
| 9,510,423 B1 | 11/2016 | Janning | | |
| 2007/0018594 A1 * | 1/2007 | Janning | ................ | H05B 37/036 315/312 |
| 2007/0222299 A1 * | 9/2007 | Pickett | ...................... | H02J 3/01 307/105 |
| 2008/0129214 A1 * | 6/2008 | Janning | ................ | H05B 39/105 315/192 |
| 2009/0091263 A1 * | 4/2009 | Janning | .............. | H05B 33/0821 315/122 |
| 2011/0210677 A1 * | 9/2011 | Hering | ............... | H01R 13/6641 315/185 R |
| 2012/0146083 A1 * | 6/2012 | Liu | ......................... | H01L 33/38 257/98 |
| 2012/0212144 A1 * | 8/2012 | Hayashi | ............... | H05B 33/089 315/193 |
| 2014/0042903 A1 * | 2/2014 | Altamura | ............. | H05B 37/036 315/51 |
| 2016/0081508 A1 * | 3/2016 | Wong | ...................... | A47G 33/06 362/123 |

* cited by examiner

*Primary Examiner* — Douglas W Owens
*Assistant Examiner* — Pedro C Fernandez
(74) *Attorney, Agent, or Firm* — Blank Rome LLP

(57) ABSTRACT

A series-wired LED light string formed of a plurality of LEDs connected in series with a current limiting resistor. A resistive component is electrically connected across each LED and serves as a shunt to electrically bypass a failed LED to keep the remaining LEDs in the light string fully illuminated. The LED light string has only two wires and is powered by a full wave rectified voltage, generated external to the light string.

8 Claims, 4 Drawing Sheets

LOW COST LED LIGHT STRING FOR PRE-LIT CHRISTMAS TREES

This application claims the benefit of Provisional Application No. 62/473,323, filed on Mar. 18, 2017.

FIELD OF THE INVENTION

The present invention relates to a series connected light string and, more particularly, to an LED light string for pre-lit Christmas trees.

BACKGROUND OF THE INVENTION

Light Emitting Diode (LED) light strings have become quite popular recently for Christmas holiday decorating. They are much more energy efficient than incandescent lighting that has been around for many years. Since both the LED and the more conventional incandescent mini-light operate at very low voltage—usually between 2.0 to 3.5 volts—they are wired in electrical series connection with approximately 35 to 50 lights in a light string. As with incandescent lighting, when an LED bulb burns out or otherwise fails, the entire series light string goes out. To prevent this, bypass shunts can be wired across each LED to continue current through the light string in the event of such a failure. Such shunts are often resistive shunts, such as disclosed in U.S. Pat. Application No. 2014/0042903, incorporated by reference herein.

One of the big drawbacks in the assembly of pre-lit Christmas trees is the wiring. Many manufacturers today power pre-lit LED Christmas trees with half wave rectification to save costs. These light strings run on half the A.C. voltage rather than full wave rectified A.C. (alternating current). Such light strings flicker and are offensive to some people. Low flicker, full wave rectified LED light strings exist, but such light strings require three, four, or sometimes even five wires in the string.

Accordingly, it would be desirable to provide a low cost, low flicker, LED light string for pre-lit LED Christmas trees.

SUMMARY OF THE INVENTION

The present invention provides a new way to construct and power light strings for pre-lit Christmas trees. Advantageously, the present invention requires only two wires in each light string for full wave low flicker operation.

Each light string of the present invention consists of a plurality of LEDs connected in series with a current limiting resistor. A resistive component is electrically connected across each LED and serves as a shunt to electrically bypass a failed LED to keep the remaining LEDs in the light string fully illuminated. The LED light string is powered by a full wave rectified voltage, generated external to the light string. The light string of the present invention simply plugs into a DC socket in the Christmas tree.

Other advantages, variations and other features of the invention will become apparent from the drawings, the further description of examples and the claims to follow.

DETAILED DESCRIPTION OF THE PREFERRED EMBODIMENTS

Figure 1:
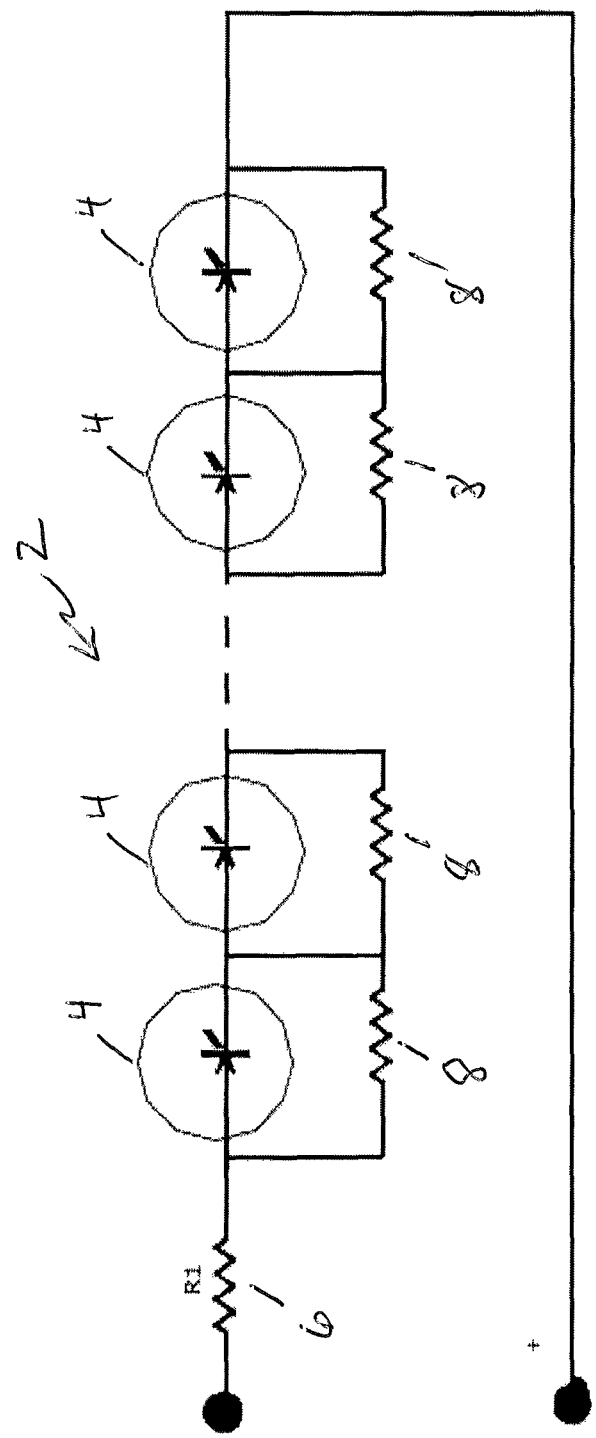
FIG. 1 shows the basic LED circuit of the present invention.

The basic LED circuit 2 is shown in FIG. 1. The basic circuit consists of a plurality of LED housings 4 (preferably, at least 15) disposed in sockets and connected in series with a current limiting resistor 6. The current limiting resistance can be between zero and 1000 Ohms. As shown in FIG. 1 and as described more fully below, each LED 4 in the string is shunted, preferably by a resistor 8, to allow current to flow (and the string to remain lit) in the event of a failure of one or more of the LEDs.

Figure 2:
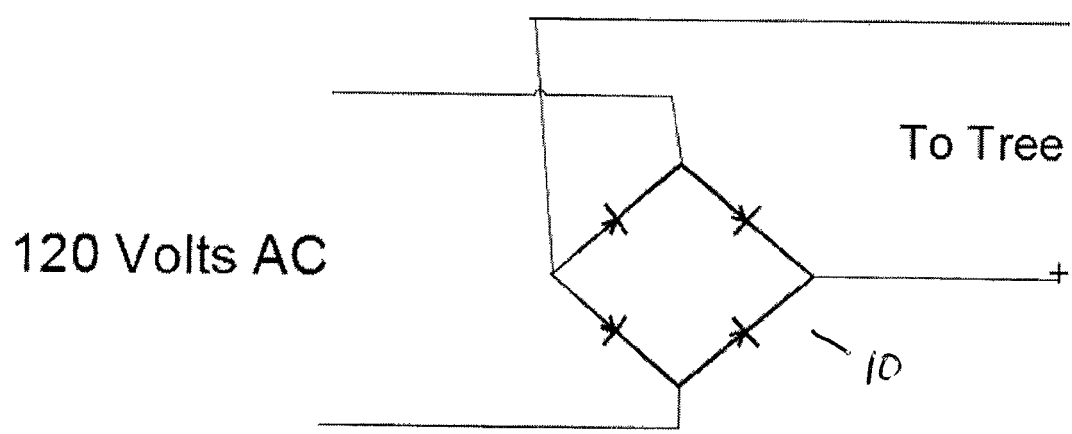
FIG. 2 show the power box containing a full wave rectifier.

Multiple basic LED light string circuits 2 may be strung on a pre-lit Christmas tree and plugged into the center trunk of the tree. These strings are all connected in parallel and connected to a power box at the bottom of the tree or in the main plug. In the power box or in the main plug is a bridge rectifier 10 converting the 120 volt house power into D.C. (direct current) to power the light strings with full wave rectification. This is shown in FIG. 2.

In one embodiment of the invention, the operating power—the output of the bridge rectifier 10—is sent up the center trunk of the tree terminating in female receptacles 18 every three to eight inches. The light strings 2 of the present invention would be connected to these receptacles via male plugs 20. The light strings as shown in FIG. 1 are "naked" regarding power conversion. They have no operating power conversion circuitry to convert the 120 volts AC house current to DC voltage required to operate the LEDs 4. This is a huge wire savings in that only two wires are needed for operation.

A shunt 8 is connected across each LED housing 4 to keep the light string operating in case of an LED failure. Shunt 8 is optional. Shunts can be resistors (approximately 680 Ohms); or NTC thermistors; TVS devices; metal oxide varistors or other semiconductor devices. The resistor R is a current limiting resistor of approximately 750 ohms. A diode (not shown) can be inserted in each light string to prevent reverse voltage from damaging the LED's.

Figure 3:
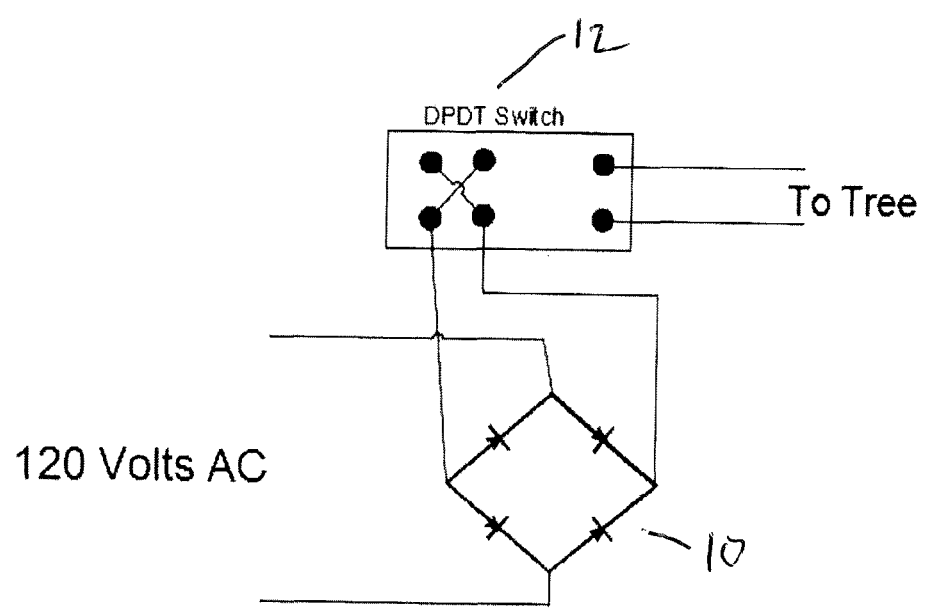
FIG. 3 shows a bridge rectifier with a DPDT switch to reverse polarity of the DC voltage.

FIG. 3 shows a bridge rectifier 10 with a DPDT switch 12 to reverse polarity. Such a switch can be used in color changing light strings such as described in U.S. Pat. No. 9,510,423, incorporated herein in its entirety.

Accordingly, the present invention provides the following important features over the prior art:

The present invention is a light string consisting of "naked" series connected LEDs, void of any operating power conversion circuitry. Operation of the light string is full wave low flicker.

Presently, light strings used in pre-lit Christmas trees have conversion circuitry to convert the 120 volt AC source to DC—which is necessary to operate LEDs. Some strings contain four or even five wires. The light string of the present invention requires only two wires because the AC to DC conversion is done externally to the string.

The "naked" LED light string of the present invention may have a series current limiting resistor R in the line with a resistance between zero and 1000 Ohms. The series wired string of LEDs may contain a diode 14 (see FIG. 4) for reverse voltage protection.

Figure 4:
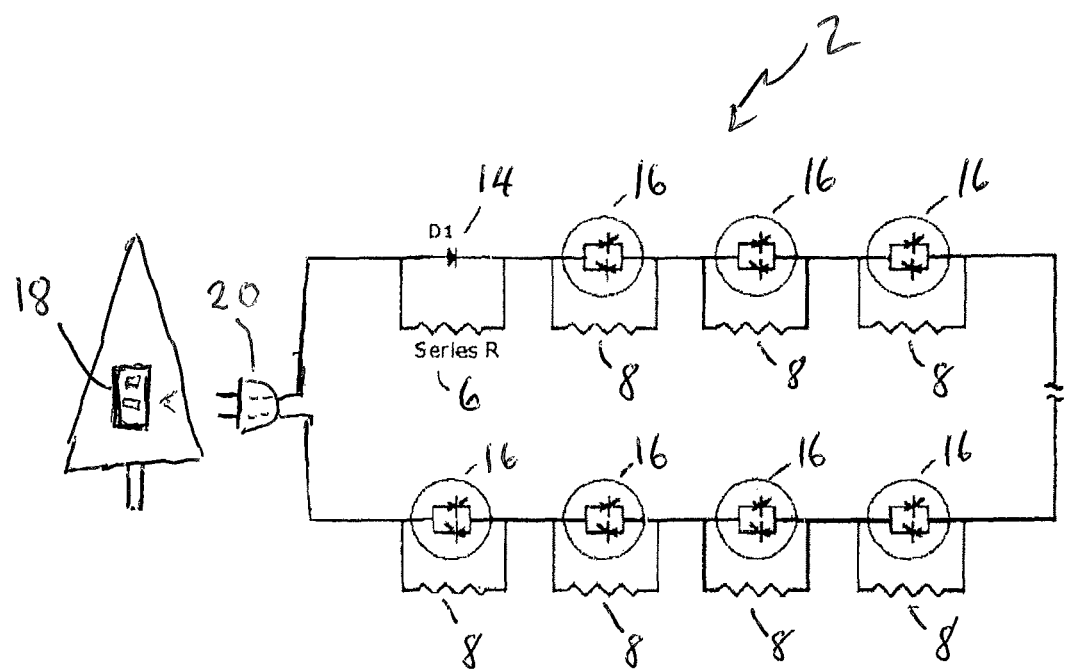
FIG. 4 shows a light string with clear and multi-color LEDs connected in an anti-parallel configuration.

Strings of clear and multicolor LEDs may overlap each other physically but polarity will determine which one illuminates. The circuit shown in FIG. 4 is a better way to go from clear to multicolor, using LEDs 16 connected in an anti-parallel configuration, one clear, the other multicolor, as disclosed and claimed in co-pending U.S. patent application Ser. No. 15/341,747, filed Nov. 2, 2016, incorporated by reference herein. In either case, operating polarity will determine which color illuminates.

The output DC from the bridge rectifier can be sent up the trunk of the tree with female receptacles every 3 to 8 inches or can be at the bottom of the tree awaiting strings to be powered. The "naked" LED strings will have male receptacle plugs. The receptacles may have polarity identification marks.

Although the invention has been described in detail in connection with the exemplary embodiments, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed is:

1. A series-wired LED light string, comprising:
    a plurality of LEDs connected in series, wherein the LEDs are disposed in housings, each housing containing a pair of LEDs disposed in an anti-parallel configuration, the anti-parallel LEDs in each housing being clear in a first direction of current and multicolor in a second direction of current, opposite to the first direction,
    a current limiting resistor disposed in series with the plurality of LEDs to control the current in the light string, and
    a resistive component connected across each pair of anti-parallel LEDs to allow current to bypass a failed LED and keep the remaining LEDs in the light string fully illuminated in the event of a failure of the LED, wherein:
    (i) the LED light string has only two wires and is powered by a full wave rectified DC voltage, generated external to the light string; and
    (ii) the two wires terminate in a plug which is adapted to fit into a socket disposed on the trunk of an artificial Christmas tree, wherein the artificial Christmas tree contains a full wave rectifier for converting an AC voltage into the full wave rectified DC voltage.

2. A series-wired LED light string as recited in claim 1, wherein the current limiting resistor is shunted by a diode.

3. A series-wired LED light string as recited in claim 1, wherein the resistive component is a resistor.

4. A series-wired LED light string as recited in claim 1, wherein the resistive component is an NTC thermistor.

5. A series-wired LED light string as recited in claim 1, wherein the resistive component is a transient voltage suppressor.

6. A series-wired LED light string as recited in claim 1, wherein the resistive component is a metal oxide varistor (MOV).

7. A pre-lit artificial Christmas tree, comprising:
    a plurality of series-wired light strings as recited in claim 1 mounted on the tree and powered by the full wave rectified DC voltage.

8. A pre-lit artificial Christmas tree as recited in claim 7, wherein the plurality of series-wired light strings are plugged into respective female sockets in the tree supplying the full wave rectified DC voltage.

* * * * *